United States Patent
Aleshire et al.

(10) Patent No.: US 9,547,656 B2
(45) Date of Patent: Jan. 17, 2017

(54) METHOD AND SYSTEM FOR IMPLEMENTING A MULTILEVEL FILE SYSTEM IN A VIRTUALIZED ENVIRONMENT

(75) Inventors: Richard E. Aleshire, San Jose, CA (US); Glenn T. Faden, San Rafael, CA (US)

(73) Assignee: Oracle International Corporation, Redwood Shores, CA (US)

( * ) Notice: Subject to any disclaimer, the term of this patent is extended or adjusted under 35 U.S.C. 154(b) by 543 days.

(21) Appl. No.: 13/570,825

(22) Filed: Aug. 9, 2012

(65) Prior Publication Data

US 2014/0046986 A1    Feb. 13, 2014

(51) Int. Cl.
G06F 7/00    (2006.01)
G06F 17/30    (2006.01)
G06F 21/62    (2013.01)

(52) U.S. Cl.
CPC ..... *G06F 17/30091* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 5,469,562 A * | 11/1995 | Saether | G06F 11/1474 711/100 |
| 6,535,949 B1 * | 3/2003 | Parker | G06F 3/0616 707/999.202 |
| 6,618,792 B1 * | 9/2003 | Perrin et al. | 711/122 |
| 7,526,774 B1 * | 4/2009 | Beck | G06F 11/3476 719/320 |
| 7,702,662 B2 * | 4/2010 | Adkins | G06F 17/30088 707/809 |
| 7,882,227 B2 * | 2/2011 | Faden | 709/225 |
| 7,885,975 B2 * | 2/2011 | Faden | 707/786 |
| 7,934,249 B2 * | 4/2011 | Chan et al. | 726/1 |
| 8,056,119 B2 * | 11/2011 | Gillet et al. | 726/2 |
| 8,180,813 B1 * | 5/2012 | Goodson | G06F 17/30997 707/827 |
| 8,200,964 B2 * | 6/2012 | Perlman | G06F 21/6209 713/165 |
| 8,219,823 B2 * | 7/2012 | Carter | G06F 21/6218 707/749 |
| 8,484,259 B1 * | 7/2013 | Makkar | G06F 17/30979 707/769 |

(Continued)

*Primary Examiner* — Hexing Liu
(74) *Attorney, Agent, or Firm* — Osha Liang LLP (57) ABSTRACT

A global zone executing on a host OS that includes a multilevel filesystem (MLFS) associated with a label range, where the MLFS includes files and directories, where each of the files is associated with its own label and where each of the directories is associated with its own label. The global zone further includes a first non-global zone, where the MLFS is mounted in the first non-global zone as a first loopback file system. The host OS is configured to receive, from a process executing on the host OS, a request to access a first file in the MLFS, make a first determination that a process label dominates a first file label, based on the first determination, make a second determination that the first file label is equal to the process label, and in response to the second determination, provide read and write access to the first file.

20 Claims, 9 Drawing Sheets

(56) References Cited

U.S. PATENT DOCUMENTS

| | | | |
|---|---|---|---|
| 2004/0015701 A1* | 1/2004 | Flyntz | G06F 21/6218 |
| | | | 713/182 |
| 2004/0025016 A1* | 2/2004 | Focke | G06F 9/45537 |
| | | | 713/164 |
| 2006/0085443 A1* | 4/2006 | Pae et al. | 707/100 |
| 2007/0005960 A1* | 1/2007 | McNamee et al. | 713/166 |
| 2007/0198714 A1* | 8/2007 | Faden | 709/225 |
| 2007/0220001 A1* | 9/2007 | Faden | G06F 21/6236 |
| 2007/0226494 A1* | 9/2007 | O'Brien | G06F 12/1491 |
| | | | 713/166 |
| 2007/0226517 A1* | 9/2007 | O'Brien | G06F 21/6218 |
| | | | 713/189 |
| 2009/0064342 A1* | 3/2009 | Chan et al. | 726/27 |
| 2010/0042722 A1* | 2/2010 | Klissner | G06F 9/45537 |
| | | | 709/226 |
| 2011/0004752 A1* | 1/2011 | Shukla | 713/152 |
| 2012/0151552 A1* | 6/2012 | Kandasamy | G06F 21/6281 |
| | | | 726/1 |
| 2013/0282795 A1* | 10/2013 | Tsao | H04L 67/1097 |
| | | | 709/203 |
| 2014/0047225 A1* | 2/2014 | Faden | G06F 9/45533 |
| | | | 713/1 |
| 2015/0324381 A1* | 11/2015 | Brand | G06F 17/30123 |
| | | | 707/829 |

* cited by examiner

METHOD AND SYSTEM FOR IMPLEMENTING A MULTILEVEL FILE SYSTEM IN A VIRTUALIZED ENVIRONMENT

BACKGROUND

Computer systems typically include access control mechanisms to control access to the data stored in the computer system. The granularity of the access control on a given computer system may vary based upon the implementation of the computer system and/or the file system operating on the computer system. When resources on a computer system are virtualized, the ability to maintain fine grained access to the data on the computer system while taking full advantage of the virtualization features may become more challenging. In particular, traditional approaches to this problem had to compromise by either limiting the virtualization features that could be implemented or by limiting the granularity of the access control.

SUMMARY

In general, in one aspect, the invention relates to a system. The system includes a processor, a host operating system (OS) configured to execute on the processor, wherein the host OS comprises a global zone comprising a multilevel filesystem (MLFS) mounted in the global zone, wherein the MLFS is associated with a label range, wherein the MLFS comprises a first plurality of files and a first plurality of directories, wherein each of the first plurality of files is associated with its own label and wherein each of the first plurality of directories is associated with its own label, and a first non-global zone, wherein the MLFS is mounted in the first non-global zone as a first loopback file system. The host OS is configured to receive, from a process executing on the host OS, a request to access a first file of the plurality of files in the MLFS, obtain a process label associated with the process, obtain a first file label associated with the first file, make a first determination that the process label dominates the first file label, based on the first determination, make a second determination that the first file label is equal to the process label, and in response to the second determination, provide read and write access to the first file.

In general, in one aspect, the invention relates to a system. The system includes a first computer comprising a processor, a host operating system (OS) configured to execute on the processor, wherein the host OS comprises, a global zone comprising a multilevel filesystem (MLFS) mounted in the global zone, wherein the MLFS is associated with a label range, wherein the MLFS comprises a first plurality of files and a first plurality of directories, wherein each of the first plurality of files is associated with its own label and wherein each of the first plurality of directories is associated with its own label. The system further includes a second computer separate from the first computer, wherein the second computer includes an interface to the MLFS. The host is configured to receive, from a process executing on second computer, a request to access a first file of the plurality of files in the MLFS, obtain a process label associated with the process, obtain a first file label associated with the first file, make a first determination that the process label dominates the first file label, based on the first determination, make a second determination that the first file label is equal to the process label, and in response to the second determination, provide read and write access to the first file.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for implementing a multilevel file system (MLFS). More specifically, embodiments of the invention relate to implementing a MLFS within a virtualized environment.

In one embodiment of the invention, a file system provides a mechanism for the storage and retrieval of files and a hierarchical directory structure for the naming of multiple files. More specifically, the file system stores information provided by the user (i.e., data in the form of files) and information describing the characteristics of the data (i.e., metadata such as, but not limited to, labels (discussed below). The file system also provides extensive programming interfaces to enable the creation and deletion of files, reading and writing of files, performing seeks within a file, creating and deleting directories, managing directory contents, etc.

In one embodiment of the invention, a MLFS is a file system in which each file and directory is associated with a label, where the labels do not have to be the same. Alternatively, a single-level file system (SLFS) (also referred to as a non-MLFS) is a file system in which each file and directory is associated with the same label. Labels are described below with respect to FIG. 2.

Figure 1:
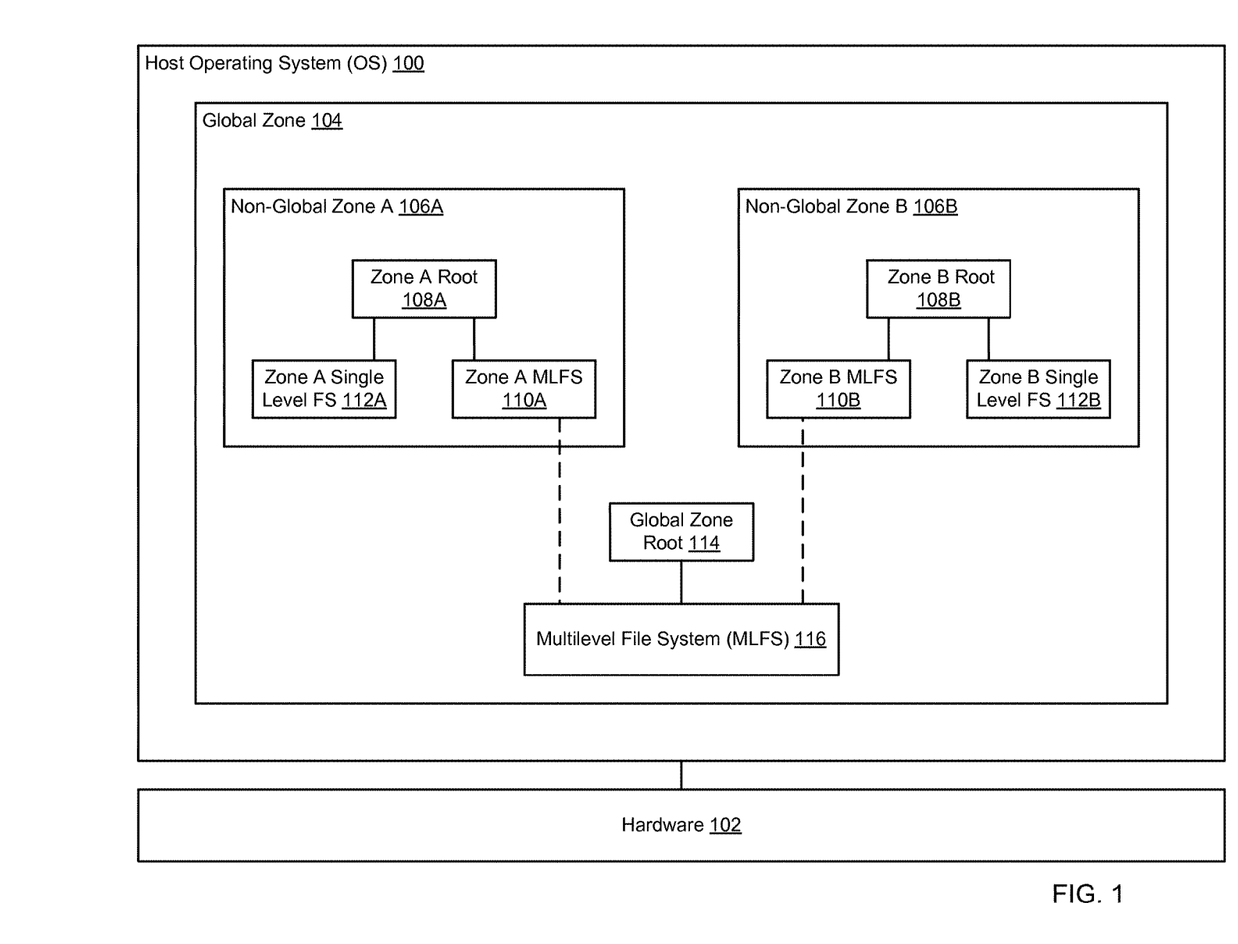
FIG. 1 shows a system in accordance with one or more embodiments of the invention.

Referring to FIG. 1, FIG. 1 shows a system in accordance with one or more embodiments of the invention. The system includes a host operating system (OS) (100) executing on hardware (102). The host OS (100) may be any OS that includes functionality to support the virtualization as described below and to implement one or more embodiments of the invention. The hardware (102) corresponds to a processor(s), memory(ies), persistent storage, input/output interfaces, and/or any other hardware components necessary to implement one or more embodiments of the invention.

In one embodiment of the invention, the host OS (100) includes functionality to support virtualization of the resources of the host OS as well as virtualization of the hardware (102). In one embodiment of the invention, the aforementioned virtualization is implemented using a global zone (104) and one or more non-global zones (106A, 106B). The global zone (104) and the non-global zones (106A, 106B) all execute on the same OS image. However, each of the zones (global and non-global) is an isolated execution environment. More specifically, processes executing in a non-global zone only have access to resources that are exposed to the particular non-global zone. As such, processes executing in one non-global zone are unable to "see" or interact with resources or processes in other non-global zones or with resources or processes in the global zone. Unlike the non-global zones, the global zone is able to "see" and interact with processes and resources within all non-global zones.

In one embodiment of the invention, the global zone (104) may include a global zone root (114) that is associated one or more MLFSs (116) and one or more SLFSs (not shown). The global zone root (114) serves as the root for all file systems in the global zone. In one embodiment of the invention, all the MLFSs (116) are directly mounted in the global zone. As such, the directories and files within the MLFS (116) reside within the global zone.

In one embodiment of the invention, each non-global zone (106A, 106B) may include a zone root (108A, 108B) that is associated with one or more MLFSs (110A, 110B) and one or more SLFSs (112A, 112B). The zone root (108A, 108B) serves as the root for all file systems in the particular non-global zone. The SLFSs (if present in a non-global zone) are directly mounted within a particular non-global zone. When a SLFS is mounted within a zone (global or non-global) the content of the SLFS file system resides within the zone in which it is mounted.

Further, one or more non-global zones may be permitted to access the contents of a MLFS by mounting the MLFS (116) as a loopback file system (LOFS) (110A, 110B) in each non-global zone that is permitted to access the MLFS. In one embodiment of the invention, from the perspective of a process in the non-global zone, a LOFS within the non-global zone appears as a file system within the non-global zone and the contents of the file system appear to reside in the non-global zone. However, in operation, the LOFS acts as a proxy to the MLFS where the LOFS does not include any files or directories but rather references to the MLFS. Said another way, while there is a LOFS in each of the non-global zones, the content of each of the LOFS and the MLFS is the same. Accordingly, when a LOFS receives a request for a file or directory, the request is sent from the LOFS to the MLFS in the global zone for processing. The result of processing the request is sent back to the LOFS, which subsequently responds to the process that initiated the request.

In one embodiment of the invention, the global zone or a process executing external to the global zone but on the host OS is responsible for controlling access (including comparing labels to determine access) to the directories and/or files in the MLFS and/or the SLFS (as described in FIGS. 3-7 below).

Figure 7:
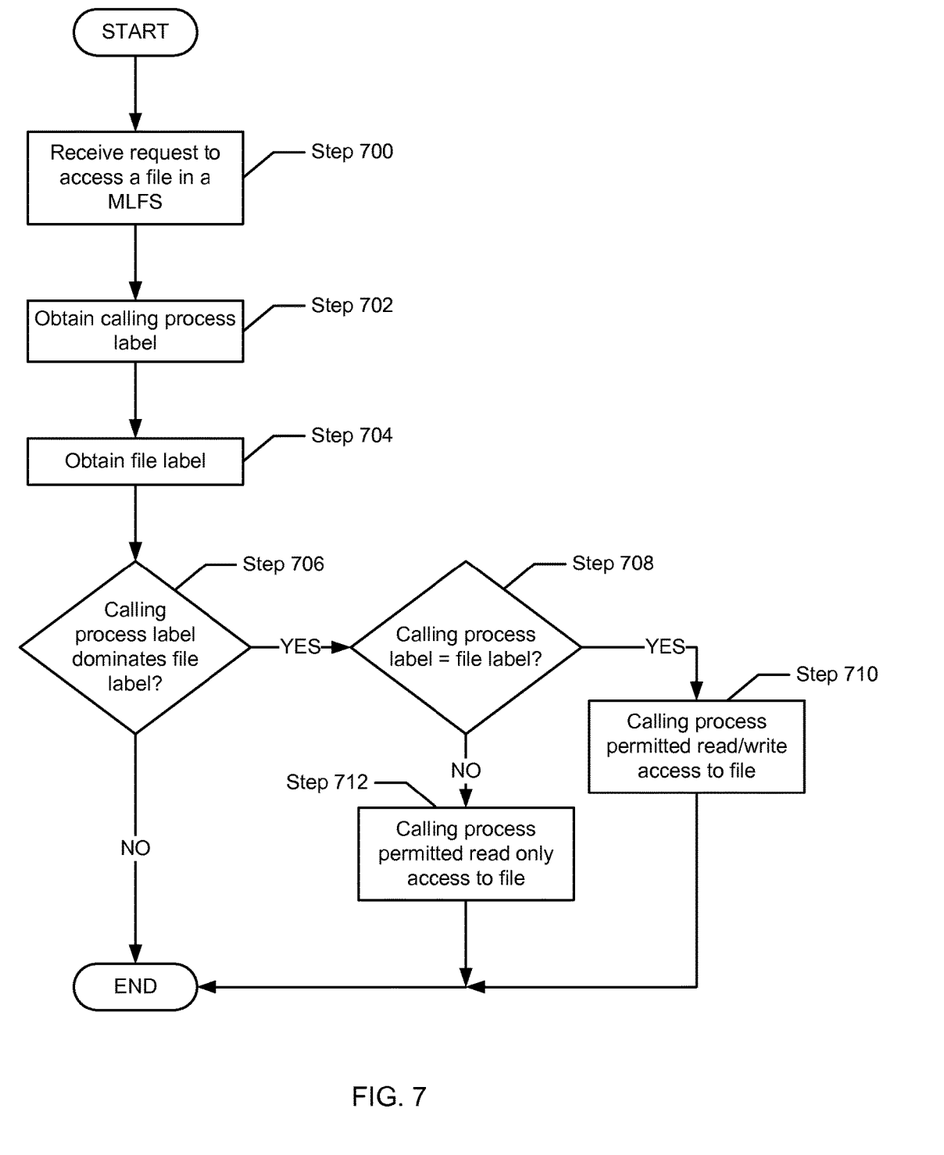
FIG. 7 shows a flowchart for accessing a file in a multilevel file system in accordance with one or more embodiments of the invention.

In one embodiment, changes made to a file in the MLFS by a process in first non-global zone may be viewed (or otherwise accessed) by a process in the second non-global zone, provided that such the process in the second non-global zone has a label that dominates the label associated with the file (see e.g., FIG. 7).

Those skilled in the art will appreciate that the invention is not limited to the system implementation shown in FIG. 1.

Figure 2:
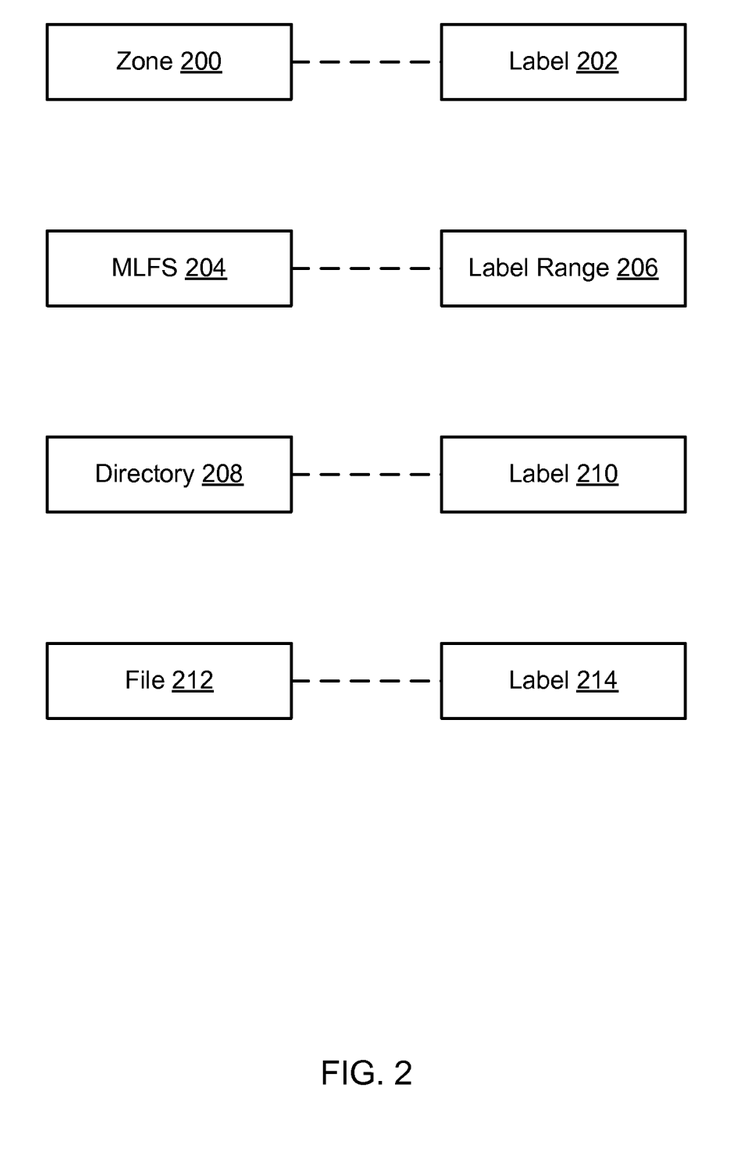
FIG. 2 shows the relationships between various components/data structures in the system in accordance with one or more embodiments of the invention.

FIG. 2 shows the relationships between various components/data structures in the system in accordance with one or more embodiments of the invention. In one embodiment of the invention, each zone (200) (global or non-global) is associated with a label (202). The global zone or a process executing external to the global zone but on the host OS may track the label associated with the each of the zones.

In one embodiment of the invention, each label is associated with a classification, which indicates the hierarchy/level of security. Some non-limiting examples of classifications include top secret, secret, confidential, unclassified, public, internal, need to know, and registered. The classification may also be denoted using any scheme based on numbers, letters, symbols, or any combination thereof. In one embodiment of the invention, a label may also include a compartment, which represents a group. Some non-limiting examples of compartments include work group, department, project, topic. The compartment may also be denoted using any scheme based on numbers, letters, symbols, or any combination thereof. A given label may include a classification component, which specifies a classification and, optionally, a compartment component, which specifies a compartment.

Returning to FIG. 2, in one embodiment of the invention, each MLFS (204) is associated with a label range (206). The label range specifies the highest level of classification that the MLFS supports. Said another way, the MLFS may not include any file or directory that has a higher classification than is specified in the label range. In one embodiment of the invention, the label range may also include specify the lowest level of classification that the MLFS supports. Said another way, the MLFS may not include any file or directory that has a lower classification than is specified in the label range. Though not shown in FIG. 2, each SLFS is implicitly associated with a label, i.e., the label of the zone in which it is mounted.

In one embodiment of the invention, each directory (208) in the MLFS (204) is explicitly associated with a label (210) and each file (212) in the MLFS (204) is explicitly associated with a label (214). In one embodiment of the invention, the label associated with each file in the MLFS is specified as an extended attribute of the file. Though not shown in FIG. 2, each directory and file in the SLFS does not include an explicitly specified label; rather, all directories and files in the SLFS have the same implicit label, i.e., the same label implicitly associated with the SLFS.

Though not shown in FIG. 2, each directory in the MLFS may include files or directories (also referred to a subdirectories) associated with labels that dominate the particular directory label. Said another way, the label associated with the contents (files and directories) of a given directory is monotonic non-decreasing relative to the directory label. (See e.g., FIG. 8). In this manner, a calling process with a label that dominates a directory label may view the content of the directory (e.g., a listing of files and directories within the directory) where one or more labels associated with the content of the directory dominate the label of the calling process.

FIGS. 3-7 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel.

Figure 3:
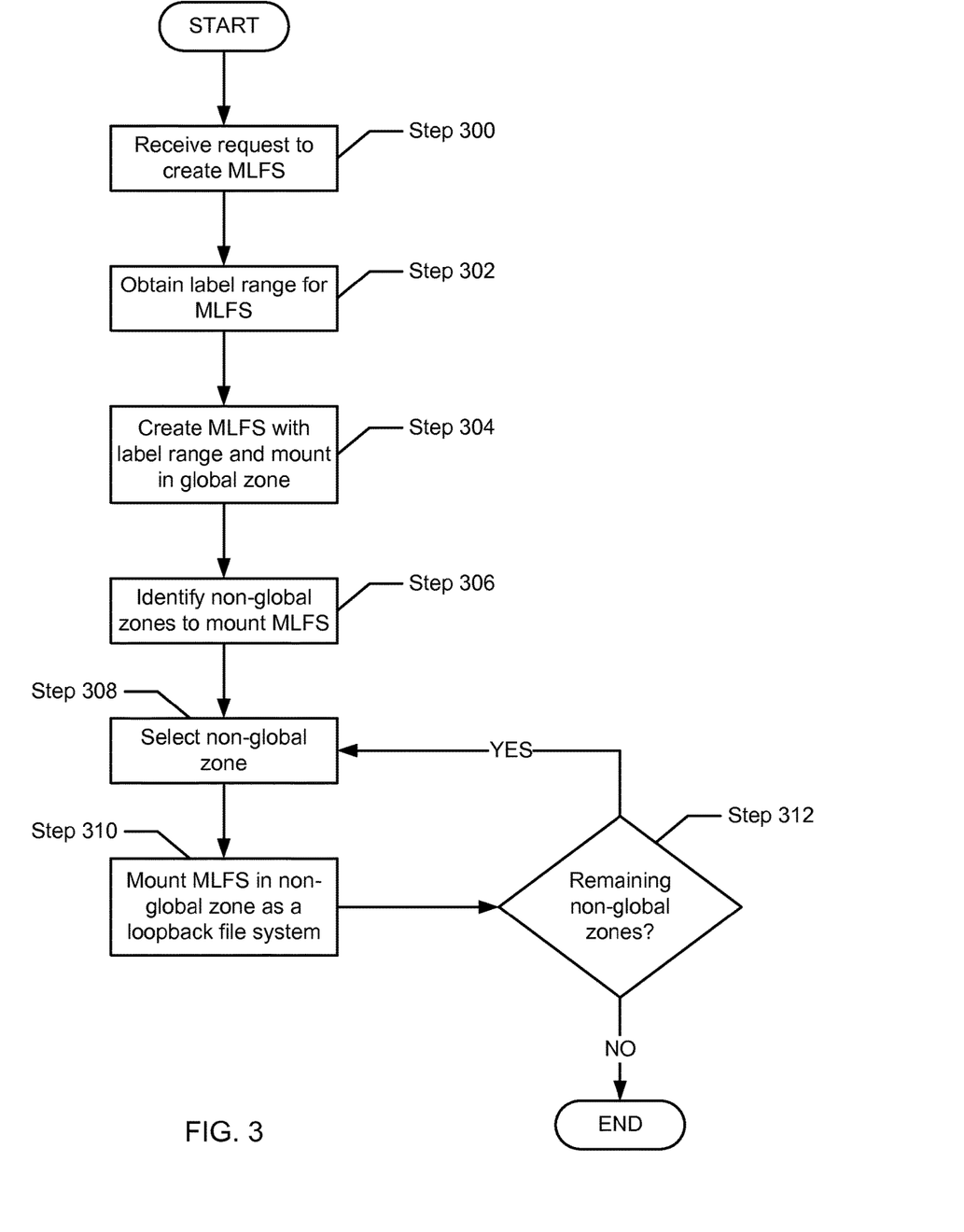
FIG. 3 shows a flowchart for creating a multilevel file system in accordance with one or more embodiments of the invention.

Referring to FIG. 3, FIG. 3 shows a flowchart for creating a multilevel file system (MLFS) in accordance with one or more embodiments of the invention. In Step 300, a request is received to create a MLFS. In one embodiment of the invention, the request is issued by a process executing the global zone. In Step 302, the label range for the MLFS is obtained. The label range may include one or more labels (as described above). The label range may be included as part of the request in Step 300 without departing from the invention.

In Step 304, the MLFS is created with the label range obtained in Step 302 and mounted in the global zone. In Step 306, one or more non-global zones in which to mount the MLFS are identified. In one embodiment of the invention, the MLFS may only be mounted in non-global zones that have labels within the label range. In one embodiment of the invention, if the label range only specifies a highest level of classification that the MLFS supports, then the MLFS is within the label range and can only be mounted (via a LOFS) in a non-global zone that is dominated (described below) by the highest level of classification. Alternatively, if the label range specifies a highest level and lowest level of classification that the MLFS supports, then the MLFS is within the label range and can only be mounted (via a LOFS) in a non-global zone that is dominated (described below) by the highest level and that dominates (described below) the lowest level of classification in the label range.

In Step 308, one of the non-global zones identified in Step 306 is selected. In Step 310, the MLFS is mounted as a LOFS in the non-global zone. In Step 312, a determination is made about whether there are any remaining non-global zones in which to mount the MLFS. If there are remaining non-global zones, the process proceeds to Step 308; otherwise, the process proceeds ends.

Figure 4:
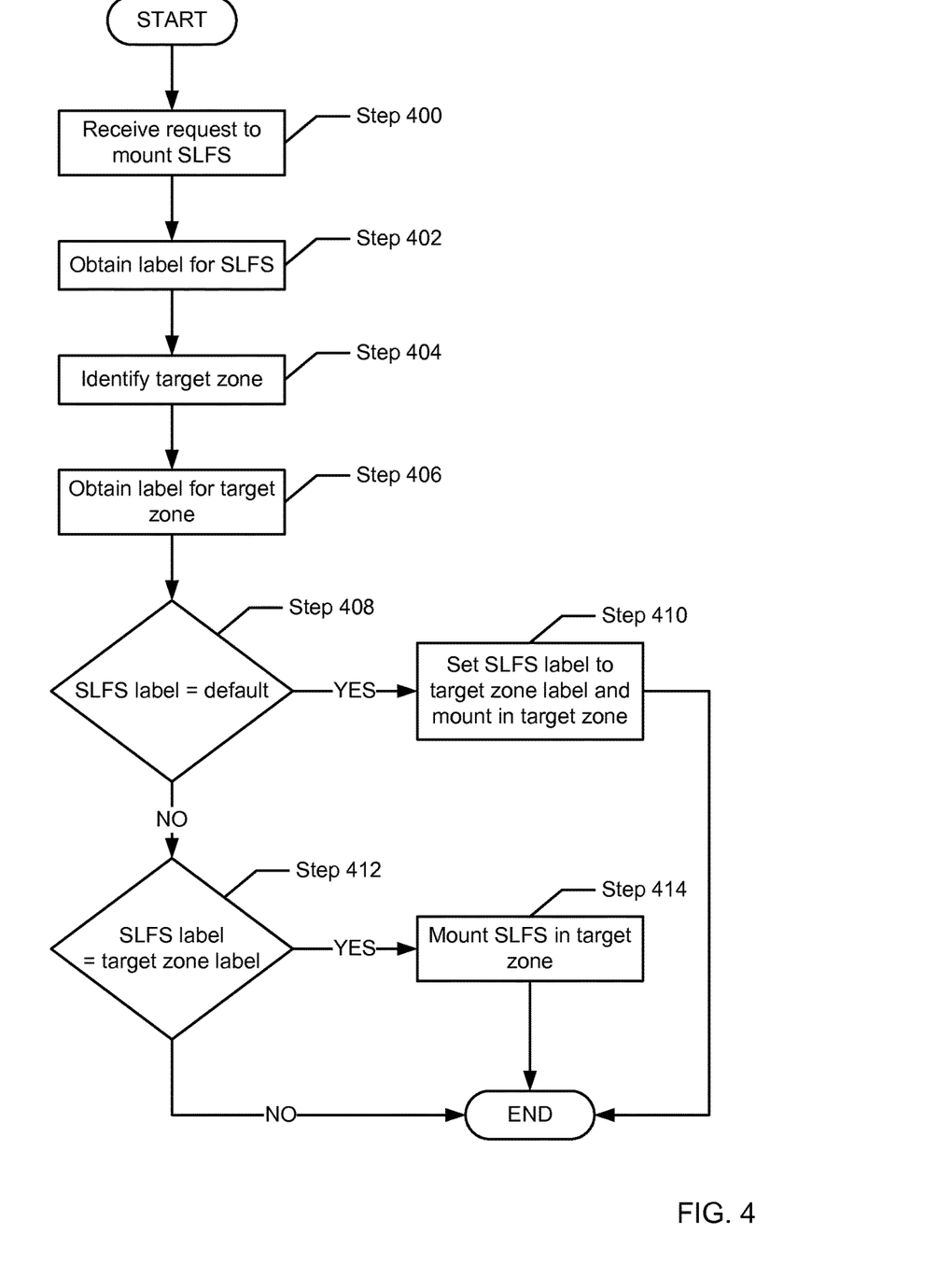
FIG. 4 shows a flowchart for creating a single level file system in accordance with one or more embodiments of the invention.

Referring to FIG. 4, FIG. 4 shows a flowchart for creating a single level file system (SLFS) in accordance with one or more embodiments of the invention. In Step 400, a request to mount a SLFS is received. The request may be received from a process in the global zone or in the non-global zone. In Step 402, the label for the SLFS is obtained. In one embodiment of the invention, the SLFS label may be a specific label or may be set as DEFAULT.

In Step 404, the target zone in which to create and mount the SLFS is identified. In Step 406, the label for the target zone is obtained. In one embodiment of the invention, the label for the target zone is obtained from a data structure in the global zone or from the host OS. In Step 408, a determination is made about whether the SLFS label (obtained in Step 402) equals DEFAULT. If the SLFS label equals DEFAULT, the process proceeds to Step 410; otherwise the process proceeds to Step 412.

In Step 410, the SLFS label is set to the label of the target zone and the SLFS is subsequently mounted into the target zone. In one embodiment of the invention, once the SLFS is mounted into the target zone, the content of the SLFS is implicitly associated with the SLFS label. Further, because the SLFS label and the target zone label match and because all processes within the target zone have the same label as the target zone, all processes in the target zone can access all of the content (directories and files) in the SLFS. Accordingly, there is no need to have confirm access rights on a per-directory or per-file basis after the SLFS has been mounted in the target zone.

Returning to FIG. 4, in Step 412, a determination is made about whether the SLFS label equals the target zone label. If the SLFS label equals the target zone label, the process proceeds to Step 414. Alternatively, if the SLFS label does not equal the target zone label, the SLFS cannot be created in the target zone and the process ends. In Step 414, the SLFS label is set to the label obtained in Step 402 and the SLFS is subsequently mounted into the target zone.

In one embodiment of the invention, a SLFS may be mounted into any target zone where the target zone label dominates the SLFS label. In such cases, if the SLFS label and the zone label and the SLFS label are not equal (i.e., the target zone label strictly dominates the SLFS label), then the SLFS is mounted in the target zone as a readonly file system (i.e., processes within the target zone cannot modify the contents of the SLFS).

Figure 5:
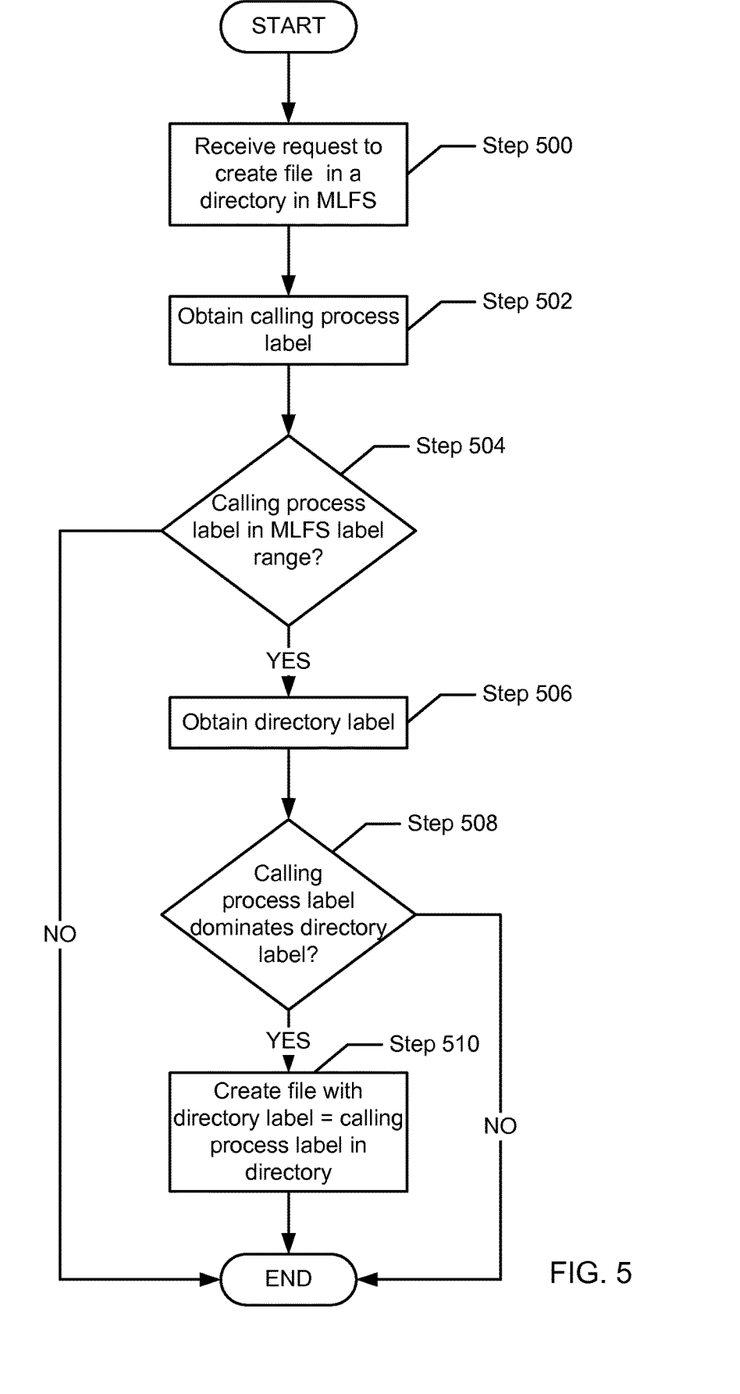
FIG. 5 shows a flowchart for creating a file in a multilevel file system in accordance with one or more embodiments of the invention.

Referring to FIG. 5, FIG. 5 shows a flowchart for creating a file in a multilevel file system in accordance with one or more embodiments of the invention.

In Step 500, a request is received to create a file in a directory in the MLFS. In one embodiment of the invention, the request is made by a calling process in a non-global zone to a LOFS (e.g., 112A, 112B). In Step 502, a calling process label for the calling process is obtained. In one embodiment of the invention, the calling process label is label associated with the calling process, where the calling process label is the same as the label in the zone in which the calling process is executing. In Step 504, a determination is made about whether the calling process label is within the MLFS label range (as described above). If the calling process label is within the MLFS label range, the process proceeds to Step 506. If the calling process label is not within the MLFS label range, then the file cannot be created within the MLFS and, as such, the request fails.

In Step 506, the directory label for the directory in which the file is to be created is obtained. In Step 508, a determination is made about whether the calling process label dominates the directory label. If the calling process label dominates the directory label, the process proceeds to Step 510. If the calling process label does not dominate the directory label, then the file cannot be created within the MLFS and, as such, the request fails.

In one embodiment of the invention, a first label dominates a second label if the following condition(s) is met: (i) the classification component of the first label is equal to or outranks the classification component of the second label and (ii) optionally, all compartments in the second label are included in the first label. Further, two labels are said to be equal if they have the same classification and, if present, the same set of compartments. If they are equal, they are said to dominate each other. Further, the first label is said to strictly domination the second label if the first label has a higher classification or includes all of the second label's compartments. Two labels are said to be disjoint or non-comparable if neither label dominates the other.

Continuing with FIG. 5, in Step 510, the file is created with a label equal to the calling process label in the directory specified in Step 500.

Figure 6:
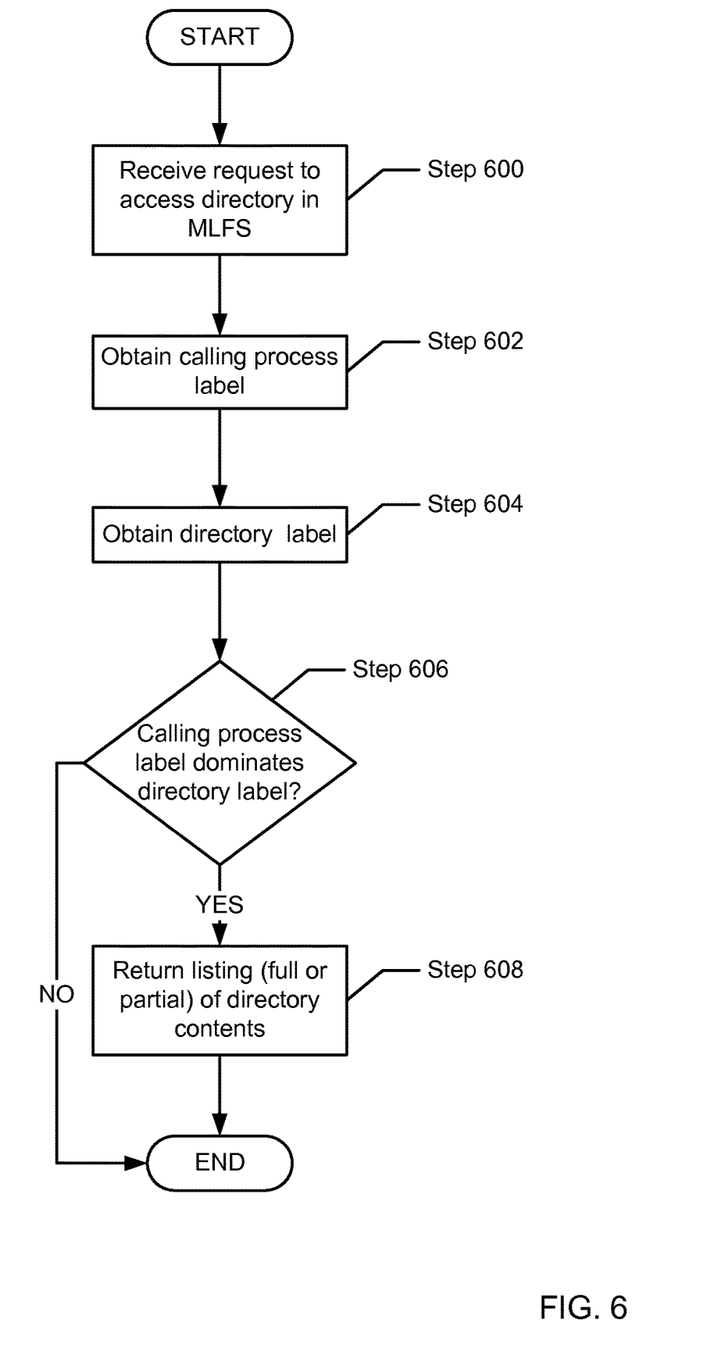
FIG. 6 shows a flowchart for accessing a directory in a multilevel file system in accordance with one or more embodiments of the invention.

Referring to FIG. 6, FIG. 6 shows a flowchart for accessing a directory in a multilevel file system in accordance with one or more embodiments of the invention.

In Step 600, a request is received to access a directory in the MLFS. In one embodiment of the invention, the request is made by a calling process in a non-global zone to a LOFS (e.g., 112A, 112B).

In Step 602, a calling process label for the calling process is obtained. In one embodiment of the invention, the calling process label is the label associated with the calling process, where the calling process label is the same as the label in the zone in which the call process is executing.

In Step 604, the directory label for the directory to be accessed is obtained. In Step 606, a determination is made about whether the calling process label dominates the directory label. If the calling process label dominates the directory label, the process proceeds to Step 608. If the calling process label does not dominate the directory label, then the directory cannot be accessed within the MLFS and, as such, the request fails. In Step 608, a listing of the directory's content is returned. In one embodiment of the invention the entire listing of the directory's content is returned. In another embodiment of the invention, the label of each sub-directory and file in the directory is compared against the calling process label and only the files and sub-directories whose labels are dominated by the calling process label are returned to the calling process. In this embodiment all other files and directories whose labels are not dominated by the calling process label are hidden from the calling process.

Referring to FIG. 7, FIG. 7 shows a flowchart for accessing a file in a multilevel file system in accordance with one or more embodiments of the invention.

In Step 700, a request is received to access a file in the MLFS. In one embodiment of the invention, the request is made by a calling process in a non-global zone to a LOFS (e.g., 112A, 112B).

In Step 702, a calling process label for the calling process is obtained. In one embodiment of the invention, the calling process label is the label associated with the calling process, where the calling process label is the same as the label in the zone in which the call process is executing.

In Step 704, the file label for the file being accessed is obtained. In one embodiment of the invention, the file label may be obtained from an extended attribute associated with the file. In Step 706, a determination is made about whether the calling process label dominates the file label. If the calling process label dominates the file label, the process proceeds to Step 708. If the calling process label does not dominate the directory label, then the file cannot be accessed in the MLFS and, as such, the request fails.

In Step 708, a determination is made about whether the calling process label equals the file label. If the calling process label equals the file label, then the process proceeds to Step 710; otherwise, the process proceeds to step 712. In Step 710, the calling process is permitted read/write access to the file. In Step 712, the calling process is permitted read only access to the file.

Figure 8:
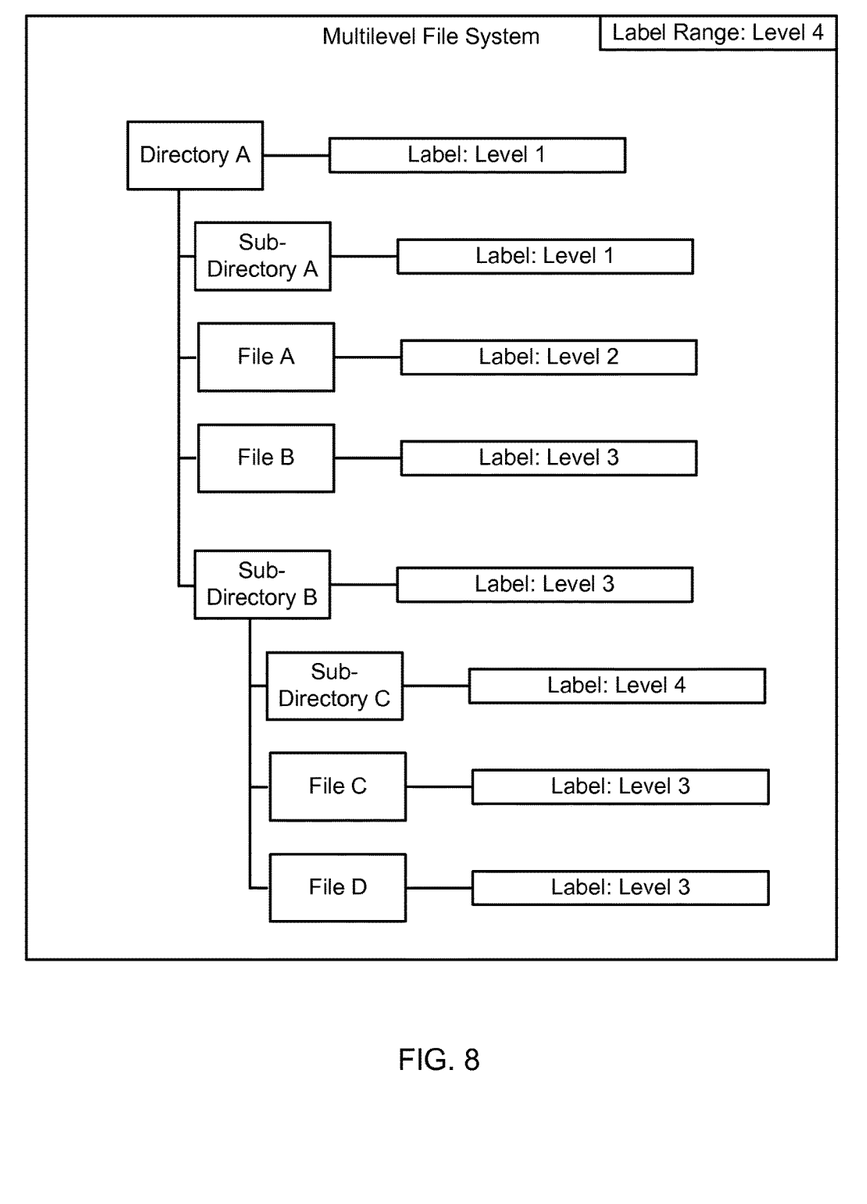
FIG. 8 shows an example of a multilevel file system in accordance with one or more embodiments of the invention.

FIG. 8 shows an example of a multilevel file system in accordance with one or more embodiments of the invention. The example is not intended to limit the scope of the invention.

Turning to FIG. 8, FIG. 8 shows a MLFS with a label range equal to level 4. In this example, the labels only include a classification component. The MLFS includes a top-level directory (directory A) with label of level 1. This is permitted because a label of level 1 is dominated by the label range.

Directory A can include directories and files that have labels dominated by the label range and that dominate the Directory A label. Specifically, in this example, Directory A includes Sub-Directory A (with label: level 1) and Sub-Directory B (with label: level 3). In addition, Directory A includes file A (with label: level 2) and file B (with label: level 3). With respect to Sub-Directory B, Sub-Directory B further includes Sub-Directory C (with label: level 4), file C (with label: level 3) and file D (with label: level 3).

Based on the above MLFS, a calling process with a calling process label:level 1 can access Directory A and "see" that Directory A includes Sub-Directory A (with label: level 1), Sub-Directory B (with label: level 3), file A (with label: level 2), and file B (with label: level 3). A calling process label:level 1 can access Sub-Directory A; but cannot access Sub-Directory B (with label: level 3), file A (with label: level 2), and file B (with label: level 3). In another embodiment of the invention, as described with respect to Step 608, a calling process label:level 1 can access Directory A and "see" that Directory A includes Sub-Directory A (with label: level 1). However, Sub-Directory B (with label: level 3), file A (with label: level 2), and file B (with label: level 3) are hidden from the calling process.

With respect to Sub-Directory A, Sub-Directory A can be accessed by a calling process with a calling process label: level 1, a calling process label:level 2, a calling process label:level 3, or a calling process label:level 4. In addition, Sub-Directory A can include directories or files with label: level 1, label:level 2, label:level 3, or label:level 4. With respect to Sub-Directory B, Sub-Directory B can only be accessed by a calling process with a calling process label: level 3 or calling process label:level 4. Further, Sub-Directory B can only include directories or files with label:level 3 or label:level 4. However, a calling process with a calling process label:level 3 cannot "see" Sub-Directory C.

Those skilled in the art will appreciate that while embodiments of the invention have been described with respect to a calling processing in a non-global zone within a global zone accessing directories and files in a MLFS located in the global zone, embodiments of the invention may be implemented by remote. For example, in one embodiment of the invention, a first system provides an interface to the MLFS located a second system. A calling process (i.e., a remote calling process) on the first system may subsequently access a file or directory in the MLFS on the second system via the interface.

In one embodiment of the invention, the interface may be implemented, for example, using Network File System (NFS) protocol, Common Internet File System (CIFS) protocol, or any protocol or mechanism that includes sufficient functionality to enable a calling process on a first system to access files or directories in an MLFS on a second system. Those skilled in the art will appreciate that methods shown in flowcharts 3-7 may be modified to support a remote calling process without departing from the invention.

Figure 9:
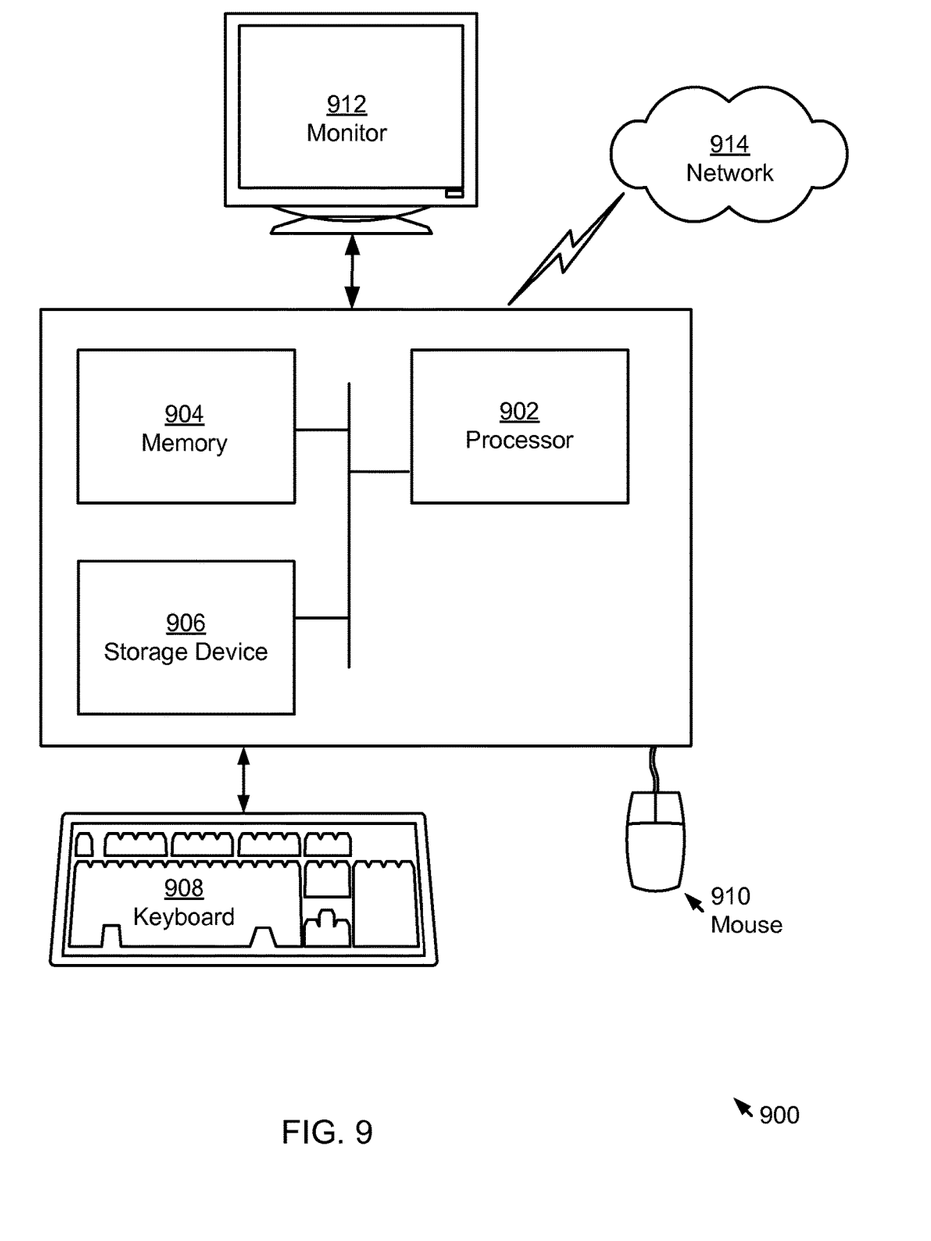
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a processor;
    a host operating system (OS) configured to execute on the processor, wherein the host OS comprises:
        a global zone comprising:
            a multilevel filesystem (MLFS) mounted in the global zone and comprising a directory and a first file located within the directory,
                wherein the directory is associated with a directory label, and
                wherein the first file is associated with a first file label that is different than the directory label;
        a first non-global zone, external to the MLFS, comprising a first loopback file system acting as a proxy to the MLFS; and
        a second non-global zone, external to the MLFS, comprising a second loopback file system acting as a proxy to the MLFS,
    wherein the host OS is configured to:
        receive, from a process executing on the host OS, a request to access the first file of a plurality of files in the MLFS,
        obtain a process label associated with the process,
        obtain the first file label associated with the first file,
        make a first determination that the process label dominates the first file label,
        based on the first determination, make a second determination that the first file label is equal to the process label,
        in response to the second determination, provide read and write access to the first file,
        receive, from the process executing on the host OS, a request to access a second file of the plurality of files in the MLFS,
        obtain a second file label associated with the second file,
        make a third determination that the process label dominates the second file label,
        based on the third determination, make a fourth determination that the second file label does not equal the process label, and
        in response to the fourth determination provide read only access to the second file.

2. The system of claim 1, wherein the host OS is further configured to:
    receive, from a second process executing on the host, a request to access the first file of the plurality of files in the MLFS,
    obtain a second process label associated with the second process,
    making a fifth determination that the second process label dominates the first file label,
    based on the fifth determination, making a sixth determination that the first file label does not equal the second process label, and
    in response to the sixth determination providing read only access to the first file.

3. The system of claim 2, wherein the first process is in the first non-global zone and the second process is in a second non-global zone on the host OS.

4. The system of claim 3, wherein the first non-global zone is associated with a first zone label and the second non-global zone is associated with a second zone label, wherein the first zone label is different than the second zone label.

5. The system of claim 4, wherein the process label is equal to the first zone label.

6. The system of claim 3, wherein the first non-global zone is associated with a first zone label and the second non-global zone is associated with a second zone label, wherein the first zone label dominates the second zone label.

7. The system of claim 1, wherein the host OS is further configured to:
    after the process has modified the first file to generate a first updated file:
        receive, from a second process executing on the host, a request to access the first updated file of the plurality of files in the MLFS, wherein the first updated file is associated with the first file label,
        obtain a second process label associated with the second process, making a fifth determination that the second process label dominates the first file label, based on the fifth determination, making a sixth determination that the first file label does not equal the process label, and in response to the sixth determination providing read only access to the updated first file.

8. The system of claim 1, wherein the MLFS is mounted in the first non-global zone with read and write permissions.

9. The system of claim 1, wherein the first non-global zone comprises a single-level file system (SLFS), wherein the first non-global zone is associated with a first label, wherein the SLFS is associated with a second label, wherein the first label and the second label are equal, and wherein the SLFS comprises a first plurality of files and a first plurality of directories, wherein each of the first plurality of files is implicitly associated with the second label and wherein each of the first plurality of directories is implicitly associated with the second label.

10. The system of claim 1, wherein the host OS is further configured to:

receive, from the process executing on the host OS, a request to access the directory of a plurality of directories in the MLFS, obtain the directory label associated with the directory, make a fifth determination that the process label dominates the directory label, and in response to the fifth determination provide a listing of contents of the directory.

11. The system of claim 10, wherein all content in the directory is associated with its own label, and wherein labels associated with the content are monotonic non-decreasing relative to the directory label.

12. The system of claim 10, wherein the directory comprises a file with a third file label and wherein the third file label strictly dominates the directory label.

13. The system of claim 12, wherein the third file label strictly dominates the process label.

14. The system of claim 1, wherein the host OS is further configured to:

receive, from the process executing on the host OS, a request to access the directory of a plurality of directories in the MLFS, obtain the directory label associated with the directory, make a fifth determination that the process label dominates the directory label, and in response to the fifth determination provide a listing of contents of the directory, wherein the listing only includes files and sub-directories whose label is dominated by the process label.

15. The system of claim 1, wherein the host OS is further configured to:

receive, from the process executing on the host OS, a request to create a third file in the directory in the MLFS, making a fifth determination that the process label is in the label range;

obtain the directory label associated with the directory, make a sixth determination that the process label dominates the directory label, and in response to the sixth determination create the third file, wherein the third file is associated with the process label.

16. The system of claim 15, wherein the process label strictly dominates the directory label.

17. A non-transitory computer readable medium comprising computer readable program code that when executed by a processor cause the processor to:

receive, from a process executing on a host operating system, a request to access a first file of a plurality of files in a multilevel filesystem (MLFS) mounted in a global zone, the MLFS comprising a directory and the first file located within the directory, wherein the directory is associated with a directory label, wherein the first file is associated with a first file label that is different than the directory label, and wherein the host operating system comprises the global zone, the global zone comprising:

a first non-global zone, external to the MLFS, comprising a first loopback file system acting as a proxy to the MLFS; and a second non-global zone, external to the MLFS, comprising a second loopback file system acting as a proxy to the MLFS;

obtain a process label associated with the process;

obtain the first file label associated with the first file;

make a first determination that the process label dominates the first file label;

based on the first determination, make a second determination that the first file label is equal to the process label;

in response to the second determination, provide read and write access to the first file;

receive, from the process executing on the host OS, a request to access a second file of the plurality of files in the MLFS;

obtain a second file label associated with the second file;

make a third determination that the process label dominates the second file label;

based on the third determination, make a fourth determination that the second file label does not equal the process label; and in response to the fourth determination provide read only access to the second file.

18. The non-transitory computer readable medium of claim 17, wherein the computer readable program code further cause the processor to:

receive, from a second process executing on the host, a request to access the first file of the plurality of files in the MLFS, obtain a second process label associated with the second process, making a fifth determination that the second process label dominates the first file label, based on the fifth determination, making a sixth determination that the first file label does not equal the second process label, and in response to the sixth determination providing read only access to the first file.

19. The non-transitory computer readable medium of claim 17, wherein the computer readable program code further cause the processor to:

after the process has modified the first file to generate a first updated file:

receive, from a second process executing on the host, a request to access the first updated file of the plurality of files in the MLFS, wherein the first updated file is associated with the first file label, obtain a second process label associated with the second process, making a fifth determination that the second process label dominates the first file label, based on the fifth determination, making a sixth determination that the first file label does not equal the process label, and in response to the sixth determination providing read only access to the updated first file.

20. The non-transitory computer readable medium of claim 17, wherein the computer readable program code further cause the processor to:

receive, from the process executing on the host OS, a request to access the directory of a plurality of directories in the MLFS, obtain the directory label associated with the directory, make a fifth determination that the process label dominates the directory label, and in response to the fifth determination provide a listing of contents of the directory, wherein the listing only includes files and sub-directories whose label is dominated by the process label.

* * * * *